United States Patent Office 3,062,791
Patented Nov. 6, 1962

3,062,791
PROCESS FOR CONTROLLING MODULUS AND COLOR OF ELASTOMERS PREPARED IN EMULSION SYSTEMS BY CONVERTING THE N-SUBSTITUTED DITHIOCARBAMIC ACID SALT SHORT STOPPING AGENT TO A SALT OF Pb, Cd, OR Hg
Carl A. Uraneck and John E. Burleigh, Bartlesville, Okla., assignors to Phillips Petroleum Company, a corporation of Delaware
No Drawing. Filed Aug. 15, 1960, Ser. No. 49,426
12 Claims. (Cl. 260—85.1)

This invention relates to a process for preparing improved elastomers from polymerizable monomeric unsaturated hydrocarbon materials by aqueous emulsion polymerization.

Raw rubber which is acceptable for the market should be free from color and when compounded should give a finished product with good properties. Elastomers prepared in emulsion polymerization systems frequently give vulcanizates which have too low a modulus to meet the requirements of the industry. One method of increasing the modulus of the finished rubber, or of controlling it within certain limits, is to have present in the composition an N-substituted dithiocarbamate. Water-soluble salts of N-substituted dithiocarbamic acids are known to be very effective shortstopping agents for emulsion polymerization systems but unless they are converted to an insoluble form, they will not remain in the rubber during the coagulation and washing steps. Iron salts which are present in many emulsion polymerization systems, whether as complex or simple compounds, will react with dithiocarbamates to give insoluble products which will remain in the rubber, but they are undesirable on account of their pronounced color, both in the raw polymer crumb and in the finished rubber. Furthermore, in many instances the finished rubber has a lower modulus than desired.

Accordingly, it is an object of the invention to provide a process for producing elastomers of improved color and from aqueous emulsion polymerization systems. Another object is to provide a process for effectively controlling color and modulus of elastomers produced by aqueous emulsion polymerization. A further object is to produce an improved elastomer of butadiene-styrene copolymer by aqueous emulsion polymerization. Other objects of the invention will become apparent to one skilled in the art upon consideration of the accompanying disclosure.

A broad aspect of the invention comprises a method for increasing the modulus and preventing color development in elastomers prepared in aqueous emulsion polymerization systems including (1) using a water-soluble salt of an N-substituted dithiocarbamic acid as the shortstopping agent, (2) adding to the latex a water-soluble lead, cadmium, or mercuric salt together with a chelating agent such as the tetrasodium salt of ethylenediamine tetraacetic acid, (3) coagulating the latex, and (4) drying the polymer crumb. When operating in this manner the raw polymer crumb is white or at most only very slightly colored and the modulus of the finished rubber is high enough to meet the specifications set up by the industry. This process is applicable to the treatment of rubber latexes produced in the presence or absence of iron salts.

The monomeric material to be polymerized in the process of the invention comprises unsaturated hydrocarbon compounds including a major amount of conjugated diene of 4 to 10 carbon atoms per molecule. Included in this class of monomers are the conjugated butadienes, or 1,3-butadienes such as butadiene (1,3-butadiene), 2,3-dimethyl-1,3-butadiene, isoprene, piperylene, 2-phenyl-1,3-butadiene, and the like; aryl olefins such as styrene, various alkyl styrenes, alphamethyl styrene, vinylnaphthalene and alkyl derivatives thereof, and the like; vinylacetylene, and other unsaturated hydrocarbons of the types described. Such unsaturated compounds may be polymerized alone, in which case simple linear polymers are formed, or mixtures of two or more of such compounds which are copolymerizable with each other in aqueous emulsion can be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, and similar compounds mentioned hereinabove. In this case the products of the polymerization are high molecular weight linear polymers and copolymers which are rubbery in character and come within the term synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants.

The process of the invention is based upon the fact that the water-soluble metal salt forms a reaction product with the dithiocarbamate that is more stable than the corresponding iron compound, and it is white or at most only very slightly colored. The reaction product must be stable at the temperature and pH used in coagulation, insoluble or only slightly soluble in the aqueous phase, at least partially soluble in the organic phase, and it must not discolor the vulcanizate in a gum or white stock. While it might appear that many water-soluble metal salts would be applicable, it has been found that only those of lead, cadmium, and mercury give the desired modulus control along with a stock which is substantially colorless. By regulating the amounts of dithiocarbamate and metal salt, a rubber product having the desired modulus specifications can be provided. Examples of metal salts which can be used, alone or in admixture therewith, include lead acetate, lead nitrate, cadmium acetate, cadmium chloride, cadmium nitrate, cadmium sulfate, mercuric acetate, mercuric chloride, and mercuric nitrate. Of the metal salts which are applicable, those of lead and cadmium are preferred.

One of the chief advantages in operating in accordance with the present process is that an excellent dispersion of the dithiocarbamate in the rubber is obtained by forming the metal salt-dithiocarbamate reaction product in situ in the latex. Another important advantage is that the process can be operated in the presence of iron salts without any interference therefrom.

The N-substituted dithiocarbamates employed are water soluble compounds or salts which can be represented by the formula

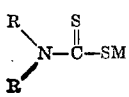

wherein

is a primary or secondary amine group, in which each R may be the same or different or may be comprised in a ring structure, and M is an alkali metal, or ammonium, or a substituted ammonium group, typified by morpholine morpholyldithionate

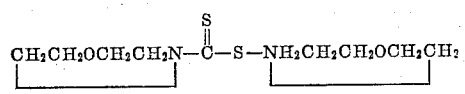

cyclohexyl sodium dithiocarbamate

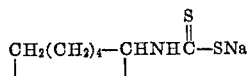

diethanol sodium dithiocarbamate

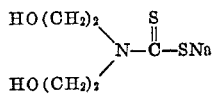

and the like. Further illustrative of these compounds are sodium N,N-dimethyl dithiocarbamate, sodium N,N-diethyl dithiocarbamate, sodium N,N-dibutyl dithiocarbamate, and sodium N,N-pentamethylene dithiocarbamate.

The amount of N-substituted dithiocarbamate to be used is in the range of 0.05 to 0.5 part per 100 parts of rubber, both by weight.

A chelating agent is employed along with at least one of the lead, cadmium, or mercuric salts to stabilize the emulsion and prevent coagulation of the latex. Suitable chelating agents are those sold on the market as Versene, Sequestrene, and Questex. The active ingredient in these products is the tetrasodium salt of ethylenediamine tetraacetic acid. Nitrilo triacetic acid is also effective.

The amount of chelating agent will generally be in the range from 1.2 to 10 moles per gram atom of lead, cadmium, or mercury employed with the preferred range being 1.4 to 5 moles chelating agent per gram atom of metal. One mole of the tetrasodium salt of ethylenediamine tetraacetic acid is regarded as chelating one gram atom of metal.

The amount of heavy metal salt used will generally range from 0.1 to 1.5 equivalents per mole of dithiocarbamate.

The present invention is not limited to any given operating procedure. One method comprises preparation of the latex, addition of the shortstopping agent, venting, steam stripping, addition of antioxidant, addition of a heavy metal salt plus chelating agent, coagulation of latex, and washing and drying of the polymer crumb. Another procedure comprises addition of the shortstopping agent, venting, addition of the metal salt plus chelating agent, stripping, addition of the antioxidant, coagulation, etc.

EXAMPLE I

Various metal salts were added to a butadiene/styrene latex in conjunction with sodium N,N-dimethyl dithiocarbamate (Thiostop N) and the tetrasodium salt of ethylenediamine tetraacetic acid (Versene Fe-3) to determine their effect on the properties of the polymer. The latex was prepared in accordance with the following recipe:

| | Parts by weight |
|---|---|
| Butadiene | 71 |
| Styrene | 29 |
| Water | 200 |
| Rosin soap [1] | 2.3 |
| Fatty acid soap, K salt | 2.3 |
| KOH | 0.07 |
| KCl | 0.30 |
| Versene Fe-3 (added in soap solution) | 0.04 |
| $NaSO_2CH_2OH \cdot 2H_2O$ | 0.05 |
| $FeSO_4 \cdot 7H_2O$ | 0.02 |
| Versene Fe-3 (added in activator solution) | 0.0035 |
| p-Menthane hydroperoxide | 0.10 |
| tert-dodecyl mercaptan | 0.19 |
| Temperature, °F | 41 |
| Time, hours | 12 |
| Conversion, percent | 59 |
| Shortstop: Thiostop N | 0.15 |

[1] Dresinate 515: Potassium salt of disproportionate rosin acid.

The latex, which had been previously shortstopped, vented, and steam stripped, was stirred while 1.5 parts by weight per 100 parts rubber of Polygard (tris-nonylphenyl phosphite), in a mixture of isopropanol and water, was added. One portion of the latex was reserved as a control while to each of the other portions Thiostop N, Versene, and one of the metal salts, aluminum sulfate, lead acetate, stannous chloride, bismuth chloride, and zinc acetate was added. Thiostop N was used in the form of an aqueous solution and the latex was stirred for five minutes after its addition. The metal salt was mixed with Versene and the pH adjusted to at least 10, if necessary, with sodium hydroxide. This mixture was added to the latex, stirring was continued, and steam was injected directly into the system to increase the temperature to 140–158° F. The latex was creamed with saturated sodium chloride solution. The cream was poured, with vigorous stirring, into an 0.5 weight percent sulfuric acid solution at the same temperature. The rubber crumb obtained from this coagulation step was washed with cold water, then three times with water at 140–158° F, and dried in an air oven at 150° F. The dry crumb from the lead acetate run was opaque white, that from the tin was white, while the other products were various shades of yellow; that containing the bismuth salt having the deepest color (bright yellow). The portion of the latex reserved as a control was salt-acid coagulated and the crumb dried as in the other runs.

Each of the dried polymer samples was compounded in accordance with the following recipe:

| | Parts by weight |
|---|---|
| Polymer | 100 |
| Channel black | 40 |
| Zinc oxide | 5 |
| Sulfur | 2 |
| Altax [1] | 2 |

[1] Benzothiazyl disulfide.

The channel black, zinc oxide, sulfur, and Altax used were NBS standard materials (NBS=National Bureau of Standards).

The compounded stocks were cured 50 minutes at 292° F. unless otherwise specified, and physical properties determined. The types and amounts of additives and physical properties of the several compositions are presented in Table I.

Table I

|  | Run No. | | | | | |
|---|---|---|---|---|---|---|
|  | 1 | 2 | 3 | 4 | 5 | 6 (control) |
| Additives: | | | | | | |
| Thiostop N: | | | | | | |
| Phr.[1] | 0.25 | 0.25 | 0.25 | 0.25 | 0.25 | |
| Mmoles | 1.75 | 1.75 | 1.75 | 1.75 | 1.75 | |
| Versene Fe-3: | | | | | | |
| Phr.[1] | 0.68 | 1.00 | 1.00 | 0.75 | 1.00 | |
| Mmoles | 1.79 | 2.63 | 2.63 | 1.98 | 2.63 | |
| Metal salt: | | | | | | |
| Type | Al, sulfate[3] | Pb, acetate[4] | Sn, chloride[5] | Bi, chloride[6] | Zn, acetate[7] | |
| Phr.[1] | 0.30 | 0.51 | 0.32 | 0.30 | 0.30 | |
| Mmoles | 0.45 | 1.34 | 1.42 | 0.90 | 1.37 | |
| Moles Versene/gram atom of metal | 2 | 2 | 1.9 | 2.2 | 1.9 | |
| Raw ML-4 at 212° F | 44.7 | 43.8 | 43.2 | 44.2 | 44.9 | 43.5 |
| Comp. ML-4 at 212° F | 59 | 59 | 56.5 | 57.3 | 57.8 | 5.5 |
| Cured stocks: | | | | | | |
| $\nu \times 10^4$, moles/cc.[8] | 0.94 | 2.20 | 0.81 | 0.84 | 0.82 | 0.78 |
| Compression set, percent | 18.8 | 10.3 | 21.0 | 18.9 | 18.9 | 21.2 |
| 300% modulus, p.s.i.: | | | | | | |
| 25' cure | 370 | 1,220 | 320 | 360 | 350 | 320 |
| 50' cure | 750 | 1,770 | 640 | 680 | 650 | 580 |
| 100' cure | 950 | 2,100 | 940 | 970 | 1,000 | 1,030 |
| Tensile, p.s.i. | 3,725 | 3,130 | 3,525 | 3,500 | 3,400 | 3,230 |
| Elongation, percent | 775 | 435 | 825 | 785 | 805 | 820 |
| Shore A hardness[2] | 56.5 | 66 | 56.5 | 56 | 57 | 57 |

[1] Parts by weight per 100 parts rubber.
[2] On compression set pellets.
[3] $Al_2(SO_4)_3 \cdot 18H_2O$.
[4] $Pb(C_2H_3O_2)_2 \cdot 3H_2O$.
[5] $SnCl_2 \cdot 2H_2O$.
[6] $BiCl_3 \cdot H_2O$.
[7] $Zn(C_2H_3O_2)_2 \cdot 2H_2O$.
[8] $\nu \times 10^4$, moles/cc.: Determined by the swelling method of Kraus as given in Rubber World 135, 67-73, 254-260 (1956). This value is the number of effective network chains per unit volume of rubber. The higher the number, the more the rubber is crosslinked (vulcanized).

Of the metal salts employed, lead acetate was the only one which had an appreciable effect on the modulus. It also increased the cure rate and, as hereinbefore stated, the dry crumb prior to compounding was essentially white.

EXAMPLE II

The effects of cadmium sulfate and ferric chloride on the color of the polymer crumb, obtained from a butadiene/styrene copolymer latex shortstopped with sodium N,N-dimethyldithiocarbamate (Thiostop N), and also upon the properties of the compounded and vulcanized polymer were determined. The butadiene/styrene copolymer latex was the same as that described in Example I. One portion of the latex was reserved as a control while two other portions were treated with Thiostop N, Versene Fe-3, and either cadmium sulfate $$(CdSO_4 \cdot 2.7H_2O)$$

or ferric chloride ($FeCl_3$). The procedure in the cadmium sulfate run was as described in Example I. In the ferric chloride run, Versene Fe-3 was added to the latex first. Aqueous solutions of Thiostop N and ferric chloride were added to an acetone solution of Polygard and this mixture was incorporated into the latex. The rubber from both runs and the control was coagulated and washed at room temperature (about 75° F.). Coagulation was effected using the salt-acid technique described in Example I, except for the temperature. The dry crumb from the cadmium sulfate run was substantially white but had a very slight yellowish tint while that from the ferric chloride was darker.

Each of the polymers was compounded using the recipe given in Example I. The compounded stocks were cured 50 minutes at 292° F., unless otherwise specified, and physical properties determined. The types and amounts of additives and physical properties of each of the compositions are presented in Table II.

Table II

|  | Run No. | | |
|---|---|---|---|
|  | 1 ($CdSO_4 \cdot 2.7H_2O$) | 2 ($FeCl_3$) | 3 (control) |
| Additives: | | | |
| Thiostop N: | | | |
| Phr | 0.26 | 0.29 | |
| Mmoles | 1.81 | 2.02 | |
| Versene Fe-3: | | | |
| Phr | 0.51 | 0.40 | |
| Mmoles | 1.34 | 1.05 | |
| Metal salt: | | | |
| Phr | 0.25 | 0.10 | |
| Mmoles | 0.97 | 0.62 | |
| Moles Versene/gram atom of metal | 1.4 | 1.7 | |
| Raw ML-4 at 212° F | 44.5 | 43.8 | 46.2 |
| Compounded ML-4 at 212° F | 60 | 59.6 | 59.6 |
| Cured stocks: | | | |
| $\nu \times 10^4$, moles/cc | 1.50 | 1.06 | 0.78 |
| Compression set, percent | 16.9 | 21.4 | 21.9 |
| 300% Modulus, p.s.i.: | | | |
| 25' cure | 680 | 380 | 230 |
| 50' cure | 1,240 | 820 | 610 |
| 100' cure | 1,700 | 1,180 | 830 |
| Tensile, p.s.i. | 4,050 | 3,600 | 3,425 |
| Elongation, percent | 620 | 710 | 830 |
| Shore A hardness | 65 | 62 | 60.5 |

These data show that the cadmium salt had a pronounced effect on the modulus. It also increased the cure rate and the dry crumb from this run (run 1), prior to compounding, was substantially opaque white.

EXAMPLE III

A butadiene/styrene copolymer latex was prepared in accordance with the following recipe.

| | Parts by weight |
|---|---|
| Butadiene | 71 |
| Styrene | 29 |
| Water | 200 |
| Dresinate 593 [1] | 4.6 |
| KOH | 0.18 |
| KCl | 0.3 |
| Tamol N [2] | 0.2 |
| Questex 4SW [3] | [4] 0.06 |

Footnotes at end of example.

| | Parts by weight |
|---|---|
| $FeSO_4 \cdot 7H_2O$ | 0.016 |
| $NaSO_2CH_2OH \cdot 2H_2O$ | 0.040 |
| p-Menthane hydroperoxide | 0.040 |
| Tert-dodecyl mercaptan | 0.20 |
| Temperature, °F | 41 |
| Time, hours | 6 |
| Conversion, percent | 60 |
| Shortstop: Thiostop N | 0.15 |
| Antioxidant: Polygard, phr | 1.25 |

[1] A 50/50 mixture of potassium tall oil soap and potassium rosin acid soap.
[2] Sodium salt of a naphthalene sulfonic acid condensed with formaldehyde.
[3] Tetrasodium salt of ethylenediamine tetraacetic acid with 4 molecules of water of crystallization.
[4] 0.032 part added in the soap solution and 0.028 part in the activator.

The latex was shortstopped and vented, and divided into two portions. A mixture of 0.20 phm. lead acetate and 0.48 phm. Questex 4SW was added to one portion. (phm.=parts by weight per 100 parts monomers) Both portions of the latex were steam stripped and coagulated. The rubber crumb from each portion was dried and compounded in accordance with the following recipes:

| | Parts by weight | |
|---|---|---|
| | 1 (lead acetate) | 2 (control) |
| Polymer | 100 | 100 |
| Philblack O [1] | 50 | 50 |
| Philrich 5 [2] | 10 | 10 |
| Zinc oxide | 3 | 3 |
| Stearic acid | 1 | 1 |
| Sulfur | 1.75 | 1.75 |
| Santocure [3] | 1.0 | 1.1 |

[1] High abrasion furnace black.
[2] Highly aromatic oil.
[3] N-cyclohexyl-2-benzothiazolesulfenamide.

*Table III*

PROCESSING DATA

| | Recipe | |
|---|---|---|
| | 1 | 2 |
| Raw ML-4 at 212° F | 59.1 | 55.5 |
| Comp. MS-1½ at 212° F | 38 | 37 |
| Extrusion at 250° F: | | |
| In./min | 41.4 | 43.5 |
| g./min | 111 | 113 |
| Rating (Garvey die) | 12 | 12- |

CURED 30 MINUTES AT 307° F.

| | | |
|---|---|---|
| $\nu \times 10^4$, moles/cc | 1.23 | 1.13 |
| Compression set, percent | 16.4 | 20.0 |
| 300% Modulus, psi | 1,510 | 1,260 |
| Tensile, psi | 3,750 | 3,470 |
| Elongation, percent | 620 | 615 |
| 200° Maximum tensile, psi | 1,600 | 1,560 |
| $\Delta T$, °F | 64.2 | 70.3 |
| Resilience, percent | 61.3 | 58.2 |
| Shore A hardness | 61.5 | 61.5 |
| Abrasion loss, grams | 9.54 | 10.38 |

Although the lead acetate treated polymer was compounded with less accelerator (Santocure) than the control, the treated rubber displayed a higher rate of cure. It had an appreciably higher modulus, as well as higher tensile strength, higher resilience, greater resistance to abrasion, and lower heat build-up.

Certain modifications of the invention will become apparent to those skilled in the art and the illustrative details disclosed are not to be construed as imposing unnecessary limitations on the invention.

We claim:

1. A process for preparing an elastomer of increased modulus and of substantially white color which comprises forming a latex by aqueous emulsion polymerization of an unsaturated hydrocarbon monomeric material comprising a major amount of a conjugated diene of 4 to 10 carbon atoms per molecule; shortstopping the polymerization with at least one water soluble N-substituted dithiocarbamate represented by the formula

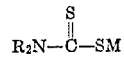

wherein $R_2N-$ is one of the group consisting of primary and secondary amine groups and M is a radical of the group consisting of alkali metal, ammonium, and substituted ammonium radicals; adding to the latex at least one water soluble metal salt of metals of the group consisting of Pb, Cd, and Hg in an amount in the range of 0.1 to 1.5 equivalents per mole of dithiocarbamate and a chelating agent in an amount in the range of 1.2 to 10 moles per gram atom of said metal; coagulating the latex; and washing and drying the polymer crumb.

2. The process of claim 1 wherein the monomeric material consists essentially of a major proportion of butadiene and a minor proportion of styrene.

3. The process of claim 2 wherein the amount of said dithiocarbamate is in the range of 0.05 to 0.5 part per 100 parts of elastomer by weight.

4. A process for preparing an elastomer which comprises polymerizing a monomeric material consisting essentially of a major proportion of butadiene and a minor proportion of styrene in an aqueous emulsion polymerization system to form a latex; shortstopping the polymerization with at least one water soluble N-substituted dithiocarbamate represented by the formula

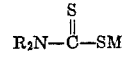

wherein $R_2N-$ is one of the group consisting of primary and secondary amine groups and M is a radical of the group consisting of alkali metals, ammonium, and substituted ammonium radicals in an amount in the range of 0.05 to 0.5 part per 100 parts of elastomer by weight; adding to the said system at least one water soluble metal salt of the metals of the group consisting of Pb, Cd, and Hg in an amount in the range of 0.1 to 1.5 equivalents per mole dithiocarbamate and a chelating agent in an amount in the range of 1.2 to 10 moles per gram atom of said metal; coagulating the latex; and washing and drying the polymer crumb.

5. The process of claim 4 using Pb as said metal.
6. The process of claim 4 using Cd as said metal.
7. The process of claim 4 using Hg as said metal.
8. The process of claim 4 using a chelating agent consisting essentially of the tetrasodium salt of ethylenediamine tetraacetic acid.
9. The process of claim 4 using sodium N,N-dimethyldithiocarbamate as the shortstopping agent.
10. The process of claim 9 using the tetrasodium salt of ethylenediamine tetraacetic acid as the chelating agent.
11. The process of claim 9 using lead acetate as said metal salt.
12. The process of claim 9 using cadmium sulfate as said metal salt.

References Cited in the file of this patent

UNITED STATES PATENTS 2,602,078    Schulze _____ July 1, 1952